Patented July 3, 1923.

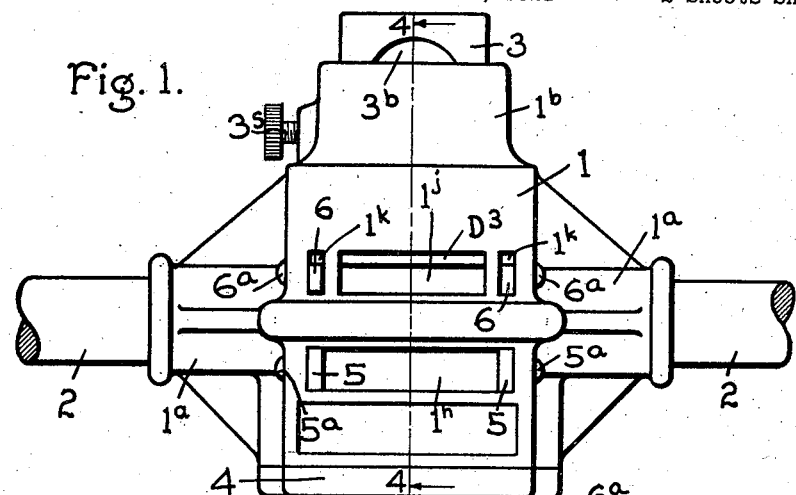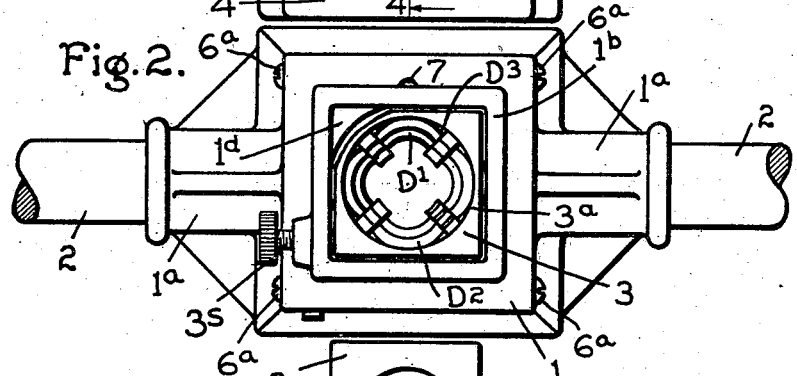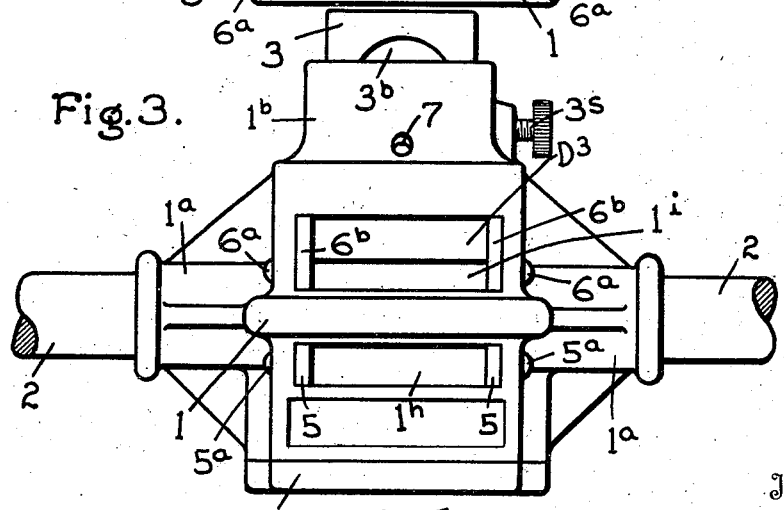

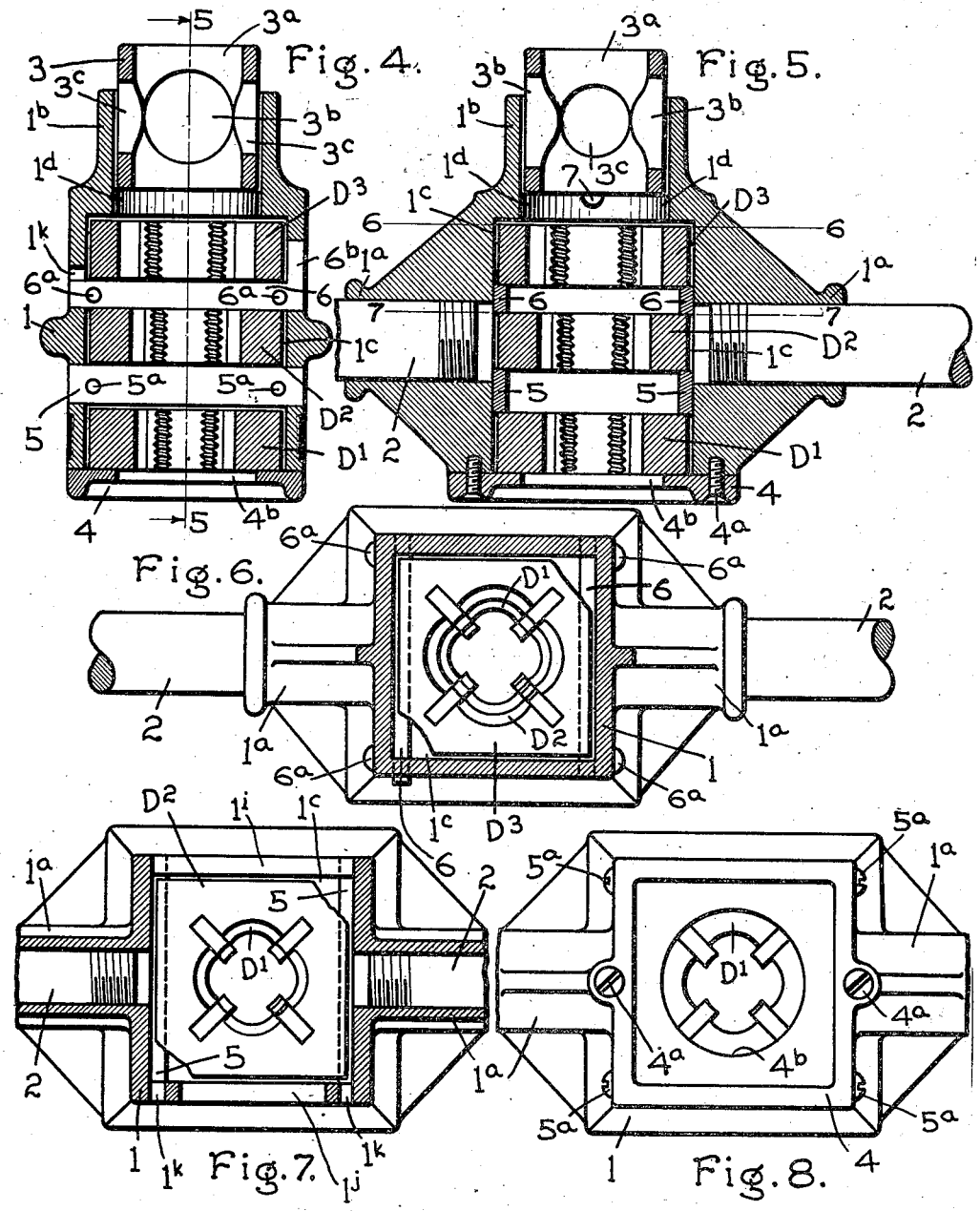

1,460,786

UNITED STATES PATENT OFFICE.

WILLIAM V. BULMAN, OF PHILADELPHIA, PENNSYLVANIA.

DIESTOCK.

Application filed November 2, 1921. Serial No. 512,298.

*To all whom it may concern:*

Be it known that I, WILLIAM V. BULMAN, a citizen of the United States, residing at Philadelphia, in the county of Philadelphia and State of Pennsylvania, have invented certain new and useful Improvements in Diestocks; and I hereby declare that the following is a full, clear, and exact description thereof, reference being had to the accompanying drawings, which form part of this specification.

This invention is a novel die cutting stock and guide. Its object is to provide a novel stock with a plurality of removable and changeable dies of different size, and an adjustable guide whereby pipes or rods of different sizes may be properly guided to the related cutters. The guide can readily be adjusted so that the stock can be used for threading a pipe or rod of given size conforming to any one of the dies in the stock by simply changing the position of the guide, and the dies may be readily removed for repairs and replaced as desired. I will explain the invention with reference to the accompanying drawings, which illustrates one practical embodiment thereof, and set forth in the claims the novel features of the invention the novel combinations of parts for which protection is desired.

In said drawings:

Fig. 1 is a view of one side of the complete die-stock.

Fig. 2 is a bottom plan view thereof.

Fig. 3 is a view of the reverse side of the die-stock from that shown in Fig. 1.

Fig. 4 is a vertical section on the line 4—4, Fig. 1.

Fig. 5 is a vertical section on the line 5—5, Fig. 4.

Fig. 6 is a horizontal section on the line 6—6 Fig. 5 looking downward.

Fig. 7 is a horizontal section on the line 7—7 Fig. 5 looking upward.

Fig. 8 is a bottom plan view of the die-stock.

The die stock comprises a body 1, which is preferably cast, approximately rectangular in cross section, as shown, and provided at opposite sides with socket members $1^a$ for the reception of handle pieces 2 which may be screwed thereinto as indicated in Fig. 5. This body has a preferably rectangular extension $1^b$ on its upper end the opening in which is preferably rectangular and slightly smaller than the rectangular opening extending through the body. Internal shoulders $1^d$ are formed in the lower corners of the extension $1^b$ at the upper end of the bore $1^c$ in the body.

Upon these shoulders $1^d$ is supported a removable cubical guide 3 which is formed with three diametrical bores $3^a$, $3^b$, $3^c$. These bores being arranged at right angles to and intersecting each other, as shown, so that by turning the block 3 any one of these bores may be brought into axial alinement with the bore $1^c$ of the body for the purpose of guiding a pipe or rod into the bore $1^c$ and to the related die in the stock. If desired the guide 3 when adjusted may be secured in the stock by a milled thumb screw $3^s$ tapped through a wall of the extension $1^b$.

The bottom or end of the stock opposite the extension $1^b$ is provided with a removable plate 4 which may be fastened thereto by screws $4^a$, having an opening $4^b$ of slightly larger diameter than the largest pipe or rod which may be handled by the die-stock. Supported on this plate in the lower end of the body is a thread cutting die $D^1$, which may be of any suitable construction, and is preferably rectangular so that it can fit easily within the bore $1^c$ in the body. This cutting die is confined in the body between the plate 4 and transversely disposed flanges or bars 5 which may be formed integral with the body in the casing but are preferably formed separate and secured thereto by any suitable means, sunken screws $5^a$ being indicated in the drawings. In the opposite side walls of the body adjacent the end of the bars 5 and above the die $D^1$ are formed openings $1^h$ through which the cutting die $D^1$ can be inspected; and through which any cuttings can be readily discharged from the die stock.

Supported upon the bars or flanges 5 within the stock is a second removable cutting die $D^2$ which may be of any suitable construction, but is preferably formed like the die $D^1$ but is adapted to thread a pipe or rod of larger size. This die $D^2$ is confined in position by means of transverse rods or bars 6 which are inserted through openings $1^i$ and $1^j$ in opposite sides of the body above the openings $1^h$. These bars 6 may be fastened by any suitable means; screws $6^a$ being indicated in the drawings, so as to securely retain the die $D^2$ in position. The opening $1^i$ is preferably made sufficiently large to permit the die $D^2$ to be inserted or removed therethrough when the bars 6 are removed.

The bars 6 preferably have upstanding ears $6^b$ on one end which fit between the upper and lower walls of the opening $1^i$ as shown in Figs. 3 and 4. The other ends of the bars 6 are of smaller diameter and are adapted to project into small guide openings $1^k$ at the ends of slot $1^j$ in the wall of the body opposite the opening $1^i$.

A third cutting die $D^3$ is placed in the die stock and confined between the bars 6 and the shoulders $1^d$ at the upper end of the bore $1^c$ of the body as shown in Figs. 4 and 5. The die $D^3$ is insertable and removable through the opening $1^i$ when the bars 6 are removed. After the cutting dies $D^2$, $D^3$ are inserted in the body the bars 6 are positioned and fastened as shown and described. By removing the bars 6 either die $D^2$ or $D^3$, or both, can be removed or replaced at will through the opening $1^i$.

An oil hole or holes 7 may be made in the die stock, as shown, through which oil can be supplied to the upper or innermost cutting die $D^3$.

The bore $3^a$ in the guide 3 is the largest and the guide would be adjusted, as shown in Fig. 4, when it is desired to have the guide die $D^3$ operate upon a rod or pipe. The bore $3^b$ in the guide is of the proper size to guide a rod or pipe to the cutter $D^2$; and the bore $3^c$ is of the proper size to guide a rod or pipe to the die $D^1$. Thus it will be seen that it is not necessary to change the dies $D^1$, $D^2$, $D^3$ in the stock when it is desired to thread a rod or pipe of any one of the three sizes, it only being necessary to adjust the guide 3 so that the bore therein corresponding to the size of the rod or pipe will be positioned to direct such rod or pipe to the proper cutting die.

The utility of the die stock, the facility of removal and replacing of the cutting dies therein and the ease of adjustment of the guide 3 so as to properly direct a rod or bar of the desired size to the related cutting die, and the manner of using the die stock, will be readily understood from the foregoing; and requires no further explanation.

What I claim is:

1. A die stock comprising a body having an axial bore; a plurality of superposed cutting dies arranged within the bore; means for removably securing each of the dies in the body, and a changeable guide in the upper end of the body having a plurality of intersecting bores respectively corresponding to the respective cutting dies whereby by properly setting the guide a rod or pipe of any desired size may be directed by the guide to the related cutting die.

2. A die stock as set forth in claim 1 having the body provided with an opening in its side for the insertion or removal of the cutting dies.

3. A die stock as set forth in claim 1, having an opening in its side communicating with the bore for the insertion or removal of cutting dies, and removable bars insertable in said opening and between the cutting dies to position the same within the body.

4. A die stock as set forth in claim 1, having the body provided with an opening in its side for the removal and insertion of cutting dies and a removable plate attached to the lower end of the stock to confine the lowermost cutting die therein.

5. A die stock as set forth in claim 1, having openings in its side communicating with the bore and removable bars insertable in the openings and between the cutting dies to position the same within the body, and a removable plate attached to the lower end of the stock to confine the lowermost cutting die therein.

6. A die stock as set forth in claim 1 having a socket adjacent the largest cutting die and a removable cubical guide seated in said socket and provided with a plurality of intersecting bores respectively corresponding to the related cutting dies in the body.

7. A die stock comprising a body having a bore and provided with an opening in its side for the insertion and removal of cutting dies, openings in opposite sides of the body below said first opening for access to the dies; a plurality of cutting dies within the body, transverse members spacing the cutting dies and a removable bottom plate confining the lowermost cutting die in the body.

8. A die stock as set forth in claim 7 having a socket adjacent the largest cutting die and a removable cubical guide seated in said and provided with a plurality of intersecting bores respectively corresponding to the related cutting dies in the body.

9. A die stock comprising a body having a bore, an opening in the side of the body for the insertion and removal of cutting dies, and openings in opposite sides of the body below the said first opening for access to the dies; a removable bottom plate; a plurality of dies arranged within the bore of the body; transverse members in the body spacing the lowermost cutting due from the superposed die, and removable members extending through openings in the body and between the intermediate and uppermost cutting dies to fasten them in place, substantially as described.

10. A die stock as set forth in claim 9 having a socket in one end adjacent the largest cutting die, and a removable cubical guide seated in said flange and provided with a plurality of intersecting bores respectively corresponding to the related cutting dies in the body.

11. A die stock comprising a body having a rectangular bore open at its lower end and upper and lower openings in its opposite sides, members extending across the bore and through the lower openings, a cutting die supported on said members, a pair of bars extending through the upper openings and confining the said cutting die in place, a cutting die within the body supported upon the last mentioned bars and confined in position thereby, and a cutting die confined in the lower end of the bore of the body, substantially as described.

12. A die stock as set forth in claim 11 having a socket in the body at the upper end of the bore and a removable cubical guide seated in said socket and provided with a plurality of intersecting bores respectively corresponding to the related cutting dies in the body, substantially as described.

13. In a die stock, a body having a rectangular bore open at its lower end, and upper and lower pairs of openings in its opposite sides, a cutting die in the lower end of the bore; a plate attached to the body and confining the lower cutting die in the bore, members within the lower openings holding down the lower cutting die, a second cutting die supported on said members, a pair of bars within the upper openings confining the second cutting die in place; and a third cutting die within the body supported upon the said bars and confined in position thereby, substantially as described.

14. A die stock as set forth in claim 13 having a rectangular socket at the upper end of the bore and a removable cubical guide seated in said socket and provided with a plurality of intersecting bores respectively corresponding to the related dies in the body, substantially as described.

15. In a die stock, a body having a rectangular bore open at its lower end, a pair of openings in its opposite sides adjacent its lower end and a second pair of openings at opposite sides above the first openings for the insertion and removal of cutting dies; members extending across the bore at opposite sides of the first pair of openings, a cutting die supported on said members; a pair of bars in the second openings extending across the bore and confining the said cutting die in place, a cutting die in the bore supported upon the last mentioned bars and confined in position thereby; a cutting die in the lower end of the bore below the openings, and a plate attached to the body and confining the lowermost cutting die in place, substantially as described.

16. A die stock as set forth in claim 15 having a socket at the upper end of the bore, and a removable cubical guide in said socket provided with a plurality of intersecting bores respectively corresponding to the related cutting dies in the body.

In testimony that I claim the foregoing as my own, I affix my signature.

WILLIAM V. BULMAN.